United States Patent
Buil et al.

(10) Patent No.: US 11,468,595 B2
(45) Date of Patent: Oct. 11, 2022

(54) PERSONAL CARE DEVICE LOCALIZATION

(71) Applicant: KONINKLIJKE PHILIPS N.V., Eindhoven (NL)

(72) Inventors: Vincentius Paulus Buil, Veldhoven (NL); Lucas Jacobus Franciscus Geurts, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 43 days.

(21) Appl. No.: 16/957,391

(22) PCT Filed: Jan. 28, 2019

(86) PCT No.: PCT/EP2019/051932
§ 371 (c)(1),
(2) Date: Jun. 24, 2020

(87) PCT Pub. No.: WO2019/158344
PCT Pub. Date: Aug. 22, 2019

(65) Prior Publication Data
US 2021/0398315 A1  Dec. 23, 2021

(30) Foreign Application Priority Data
Feb. 14, 2018  (EP) .................................... 18156753

(51) Int. Cl.
*G06T 7/73* (2017.01)
*G06T 7/246* (2017.01)
(Continued)

(52) U.S. Cl.
CPC ................ *G06T 7/73* (2017.01); *A45D 44/00* (2013.01); *G06F 3/017* (2013.01); *G06T 7/246* (2017.01);
(Continued)

(58) Field of Classification Search
None
See application file for complete search history.

(56) References Cited

U.S. PATENT DOCUMENTS

| 7,344,498 B1 | 3/2008 | Doughty et al. |
| 8,744,192 B2 | 6/2014 | Christman et al. |

(Continued)

FOREIGN PATENT DOCUMENTS

| WO | WO2013001462 | * | 1/2013 |
| WO | 2015068068 A1 | | 5/2015 |

OTHER PUBLICATIONS

Hao-Yu Wu et al., "Eulerian Video Magnification for Revealing Subtle Changes in the World". ACM Transactions on Graphics, vol. 31, No. 4, Article 65, Publication Date: Jul. 2012.
(Continued)

*Primary Examiner* — Delomia L Gilliard

(57) ABSTRACT

There is provided an apparatus (100) for determining a location of a personal care device on a user. The apparatus (100) comprises a processor (102) configured to detect a location of one or more parts of the body of a user, detect motions of at least one of the parts of the body of the user induced by the personal care device when the personal care device is in use and determine the location of the personal care device on the user based on the detected motions of the at least one part of the body of the user in relation to the detected location of the at least one part of the body of the user. The processor (102) is configured to acquire images of the user from an imaging sensor (108) directed at the user, and detect the location of the one or more parts of the body of a user and the motions of the at least one part of the body of the user induced by the personal care device from the acquired images of the user.

15 Claims, 4 Drawing Sheets

(51) Int. Cl.
    *G06V 10/25*     (2022.01)
    *G06V 40/10*     (2022.01)
    *G06V 40/20*     (2022.01)
    *A45D 44/00*     (2006.01)
    *G06F 3/01*     (2006.01)
    *B26B 19/38*     (2006.01)

(52) U.S. Cl.
    CPC .............. *G06V 10/25* (2022.01); *G06V 40/10* (2022.01); *G06V 40/28* (2022.01); *A45D 2044/007* (2013.01); *B26B 19/388* (2013.01); *G06T 2207/30196* (2013.01)

(56) References Cited

U.S. PATENT DOCUMENTS

| | | | |
|---|---|---|---|
| 9,324,005 B2 | 4/2016 | Durand et al. | |
| 10,227,859 B2 | 3/2019 | Hamid et al. | |
| 2002/0183959 A1* | 12/2002 | Savill | A46B 15/0012 702/150 |
| 2014/0072190 A1 | 3/2014 | Durand et al. | |
| 2014/0139616 A1* | 5/2014 | Pinter | A61B 5/742 348/14.08 |
| 2014/0161322 A1* | 6/2014 | Cheng | G06K 9/00342 382/107 |
| 2014/0218496 A1* | 8/2014 | Park | A61B 5/7465 348/77 |
| 2015/0020658 A1* | 1/2015 | Eljaouhari | B26B 19/388 83/13 |
| 2016/0284208 A1* | 9/2016 | Pfenniger | A61C 17/224 |
| 2017/0099199 A1* | 4/2017 | Bauer | H04L 67/22 |
| 2021/0204822 A1* | 7/2021 | Muehlsteff | G16H 50/30 |
| 2021/0274912 A1* | 9/2021 | Lawrenson | G06K 9/00335 |

OTHER PUBLICATIONS

Eulerian Video Magnification, http://people.csail.mit.edu/mrub/vidmag/.

International Search Report for PCT/EP2019/051932 dated Jan. 28, 2019.

* cited by examiner

PERSONAL CARE DEVICE LOCALIZATION

CROSS-REFERENCE TO PRIOR APPLICATIONS

This application is the U.S. National Phase application under 35 U.S.C. § 371 of International Application No. PCT/EP2019/051932, filed on Jan. 28, 2019, which claims the benefit of European Patent Application No. 18156753.8, filed on Feb. 14, 2018. These applications are hereby incorporated by reference herein.

FIELD OF THE INVENTION

The invention relates to an apparatus and method for determining a location of a personal care device on a user.

BACKGROUND OF THE INVENTION

Personal care devices are becoming connected, smart and personal in terms of adapting a treatment to suit a user. Some personal care devices have a sensing functionality that is used together with usage data to understand skin, hair and teeth conditions.

A critical aspect for providing personalized care to a user is for a personal care device to know its position with respect to the body of the user. This localization information (or data) can allow the personal care device to automatically adjust settings to optimize performance. For example, different treatment areas can have different characteristics and thus different treatment demands. Furthermore, the localization information provides additional value to the user, such as for usage logging, for providing an overtreatment warning, for providing advice (e.g. an indication of an optimal setting to use based on results of previous treatments), for providing feedback (e.g. on the progress of treatment results) and for determining compliance with a treatment procedure or treatment program. Finally, localization information may be of value to a manufacturer of the personal care device for use in design improvements. For example, combining information from a multitude of users can provide new and deeper insights into the users that can be useful in optimizing the design of a personal care device to achieve optimum results for users.

There exist a variety of techniques for tracking the position of a personal care device on the body of a user. Some existing techniques use a remote camera (e.g. mounted near a user) that observes the user to determine the location of a personal care device in relation to the body (e.g. the face) of the user. In an example of such a technique, computer vision is used to track light emitting diode (LED) markers that are attached to a handle of a toothbrush to determine an absolute rotational orientation of the toothbrush. This existing technique can provide information on which teeth are brushed at any given time without the use of face recognition technology. In another example, computer vision is used to track an infrared light emitting diode (IR LED) mounted at a treatment part of a personal care device in relation to the face of the user via landmark detection. In yet another example, computer vision is used to track a specific three-dimensional (3D) fiducial marker on the bottom of a personal care device in relation to the face of the user in order to calculate a position and an orientation of the personal care device and to estimate where the treatment area is located in relation to the face.

However, an issue exists with these existing techniques, which are reliant on a camera. In particular, these existing techniques require a personal care device to be adapted in some way in order to enable localization of the personal care device, such as by adding one or more markers (e.g. one or more lights) to the personal care device, which can be tracked. This adds to the complexity of the personal care device and may have an unacceptable impact on the product design. However, the use of a camera for device localization without such markers is difficult because a part of the personal care device is always obstructed by a part of the body (e.g. a hand) of the user during use. In fact, even with markers added to the personal care device, the markers can be obstructed by a part of the body (e.g. a hand) of the user during use.

WO 2010/059484 discloses an example of system that uses designated features already present on a personal hygiene implement as markers together with designated features on the user to measure the position and/or the orientation of at least a portion of the personal hygiene implement. However, there still exists the same issue with using these designated features on a personal care device in that there is still a chance that these designated features or markers may be obstructed by a part of the body (e.g. a hand) of the user during use. This issue can result in unreliable or even failed localization of a personal care device on a user.

U.S. Pat. No. 7,344,498 B1 discloses an optical measurement method of skin strain during shaving using digital cameras which record the deflection of a pattern applied to the skin. Both deflected (during shaving) and non-deflected (reference) images are required, the comparison of both images might be used to calculate strain in the skin during shaving.

WO 2015/068068 A1 discloses a programmable hair trimming system comprising a tracking system to track a hair trimming device with respect to the head of a person whose hair is to be cut wherein reference points are attached to the hair trimming device.

There is thus a need for an improved apparatus and method for determining a location of a personal care device on a user, which is aimed at addressing these limitations.

SUMMARY OF THE INVENTION

As noted above, a limitation with existing techniques for localizing a personal care device on a user is that the existing techniques rely on a camera to track the personal care device or markers on the personal care device (which may be existing markers on the personal care device or markers added to the personal care device) and this can result in unreliable or even failed device localization on the user, since a part of the body (e.g. a hand) of the user may obstruct the personal care device or the markers on the personal care device from the camera. It would thus be valuable to provide an improved apparatus and method for determining a location of a personal care device on a user, which address these limitations.

Therefore, according to a first aspect, there is provided an apparatus for determining a location of a personal care device on a user. The apparatus comprises a processor configured to detect a location of one or more parts of the body of a user and detect motions of at least one of the parts of the body of the user induced by the personal care device when the personal care device is in use. The processor is also configured to determine the location of the personal care device on the user based on the detected motions of the at least one part of the body of the user in relation to the detected location of the at least one part of the body of the user.

The processor is configured to acquire images of the user from an imaging sensor directed at the user, and detect the location of the one or more parts of the body of a user and the motions of the at least one part of the body of the user induced by the personal care device from the acquired images of the user.

In some embodiments, the processor may be configured to detect motions of the at least one part of the body of the user induced by the personal care device using Eulerian video magnification.

In an embodiment the apparatus may comprise the imaging (or image) sensor. In alternative embodiments the apparatus may be configured to communicate with and/or connect to an imaging sensor external to (i.e. separate to or remote from) the apparatus.

In some embodiments, the processor may be configured to detect a location of one or more anatomical features of the user in the acquired images of the user and detect the location of the one or more parts of the body of a user using the detected location of the one or more anatomical features of the user in the acquired images of the user.

In some embodiments, the processor may be configured to identify a signature of the detected motions of the at least one part of the body of the user induced by the personal care device, wherein the identified signature is indicative of a type of personal care device. In these embodiments, the processor may also be configured to determine the location of the personal care device on the user based on the detected motions of the at least one part of the body of the user in relation to the detected location of the at least one part of the body of the user and the identified signature of the detected motions.

In some embodiments, the processor may be configured to estimate a location of a source of the detected motions of the at least one part of the body of the user and determine the location of the personal care device on the user based on the estimated location of the source of the detected motions of the at least one part of the body of the user.

In some embodiments, the processor may be configured to determine the location of the personal care device on the user based on the detected motions of the at least one part of the body of the user in relation to the detected location of the at least one part of the body of the user and any one or more of an angle of the personal care device with respect to the at least one part of the body of the user, a setting in which the personal care device is operating, a type of at least one component of the personal care device, and a pressure applied by the personal care device on the at least one part of the body of the user.

In some embodiments, the processor may be configured to track the location of the personal care device on the user and control a user interface to output guidance to the user based on the tracked location of the personal care device on the user.

In some embodiments, the processor may be further configured to determine a local property of the at least one part of the body of the user based on the detected motions of the at least one part of the body of a user induced by the personal care device.

In some embodiments, the processor may be further configured to adjust one or more settings of the personal care device based on the determined location of the personal care device on the user. In some of these embodiments, the processor may be configured to adjust one or more settings of the personal care device based on the determined location of the personal care device on the user and the determined local property of the at least one part of the body of the user.

In some embodiments, the personal care device may comprise a hair care device and the at least one part of body of the user may comprise hair of the user. In some embodiments, the personal care device may comprise a tooth care device and the at least one part of the body of the user may comprise one or more teeth. In some embodiments, the personal care device may comprise a skin care device and the at least one part of the body of the user may comprise skin of the user.

In some embodiments, the apparatus may comprise the personal care device.

According to a second aspect, there is provided a method of operating an apparatus comprising a processor to determine a location of a personal care device. The method comprises detecting a location of one or more parts of the body of a user and detecting motions of at least one of the at least one parts of the body of a user induced by the personal care device when the personal care device is in use. The method also comprises determining the location of the personal care device on the user based on the detected motions of the at least one part of the body of the user in relation to the detected location of the at least one part of the body of the user.

According to a third aspect, there is provided a computer program product comprising a computer readable medium, the computer readable medium having computer readable code embodied therein, the computer readable code being configured such that, on execution by a suitable computer or processor, the computer or processor is caused to perform the method described above.

According to the aspects and embodiments described above, the limitations of the existing techniques described earlier are addressed. In particular, the above-described aspects and embodiments provide an improved apparatus and method for determining a location of a personal care device on a user, which address the limitations of the existing techniques. The improved apparatus and method eliminates the need for a camera to track the personal care device or markers on the personal care device, and thus resolves the issues described earlier with the obstruction of the personal care device or markers on the personal care device. A more reliable apparatus and method for determining a location of a personal care device on a user is thus provided.

These and other aspects will be apparent from and elucidated with reference to the embodiment(s) described hereinafter.

BRIEF DESCRIPTION OF THE DRAWINGS

Exemplary embodiments will now be described, by way of example only, with reference to the following drawings, in which.

DETAILED DESCRIPTION OF EMBODIMENTS

There is provided herein an apparatus and a method of operating the apparatus to determine a location of a personal care device on a user. The term "personal care" used herein is a term that is well-known to a person skilled in the art. However, generally, the term refers to personal hygiene, grooming and/or beautification. The term "personal care device" can thus refer to any device suitable for use in relation to personal hygiene, grooming and/or beautification. The personal care device may be any type of personal care device.

Examples of a personal care device include, but are not limited to, a hair care device (e.g. a hair removal device such as a hair cutting device, a hair shaver, a hair trimmer, or an epilator, a hair styling device such as a groomer, a hairbrush, a hairdryer, a hair straightening device, or a hair curling device, or any other type of device for use in hair care), a tooth care device or an oral health care device (e.g. a toothbrush, a tooth flossing device, or any other type of device for use in tooth care), a skin care device (e.g. a skin treatment device, a skin cleansing device, a skin massager device, a skin rejuvenator device, a skin analyzer device, or any other type of device for use in skin care), or any other type of personal care device. In some embodiments, the personal care device can comprise an electric personal care device. In other embodiments, the personal care device can comprise a manual personal care device.

Figure 1:
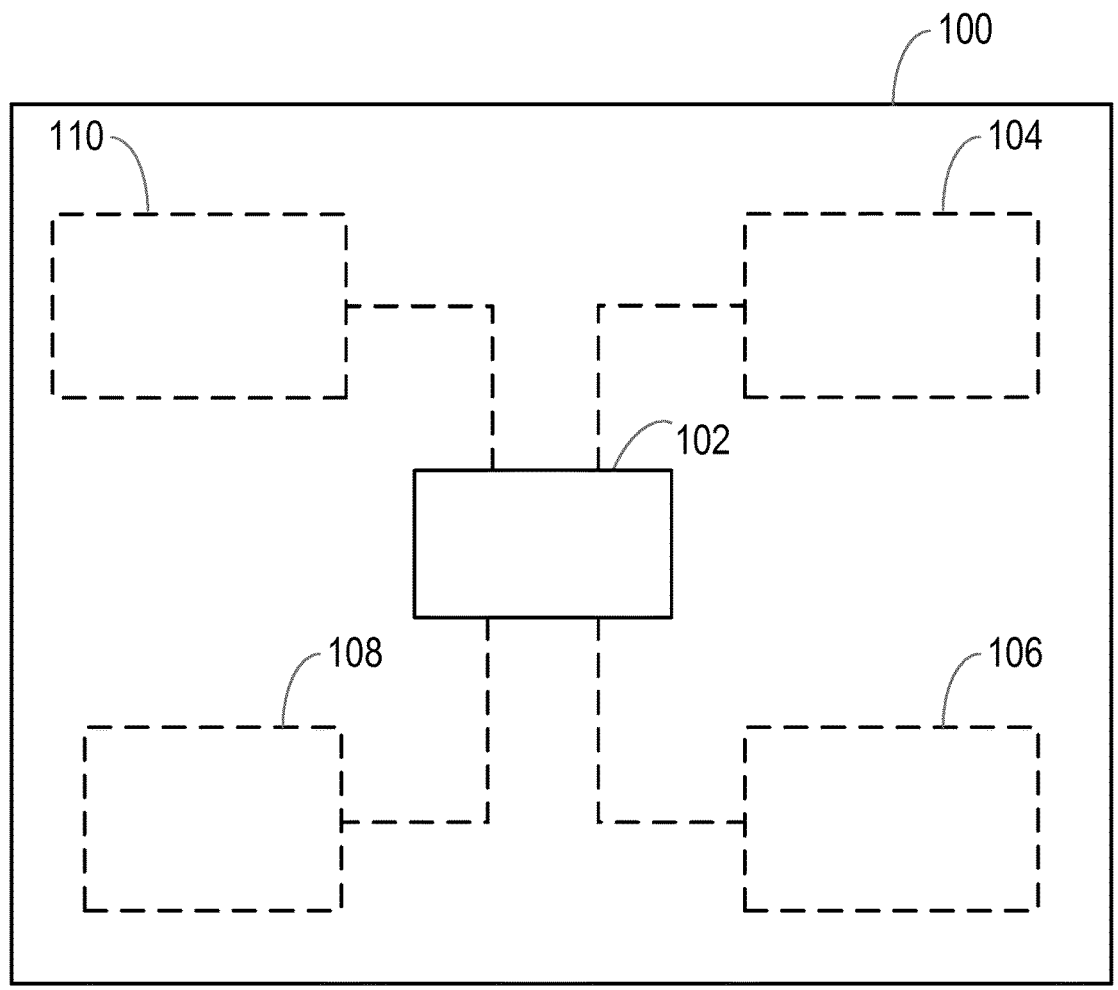
FIG. 1 is a block diagram of an apparatus according to an embodiment.

FIG. 1 illustrates a block diagram of the apparatus 100 described herein for determining a location of a personal care device on a user according to an embodiment. As illustrated in FIG. 1, the apparatus 100 comprises a processor 102. Briefly, the processor 102 is configured to detect a location (or position) of one or more parts of the body of the user, detect motions (or movements) of (e.g. on or in) at least one of the parts of the body of the user induced by the personal care device when the personal care device is in use, and determine the location of the personal care device on the user based on the detected motions of the at least one part of the body of the user in relation to the detected location of the at least one part of the body of the user. Thus, a relative location of the personal care device on the user is determined.

The at least one part of the body of the user referred to herein is the at least one part of the body of the user in relation to which the personal care device is used. For example, where the personal care device comprises a hair care device, the at least one part of body of the user can comprise hair of the user. In another example, where the personal care device comprises a tooth care device, the at least one part of the body of the user can comprise one or more teeth. In yet another example, where the personal care device comprises a skin care device, the at least one part of the body of the user can comprise skin of the user.

The motions of the at least one part of the body of the user induced by the personal care device referred to herein can, for example, comprise vibrations (e.g. micro vibrations) of the at least one part of the body of the user induced by the personal care device. For example, when using a skin cleansing device on the face, a rotating brush of the skin cleansing device can cause motions (e.g. vibrations) on the skin of the face of the user, which can be detected. As mentioned earlier, the personal care device can comprise an electric personal care device or a manual personal care device. Generally, an electric personal care device induces motion of the at least one part of the body of the user that are faster and that have a lower amplitude than motions of the at least one part of the body of the user induced by a manual personal care device. On the other hand, a manual personal care device induces motion of the at least one part of the body of the user that are slower and that have a higher amplitude than motions of the at least one part of the body of the user induced by an electric personal care device.

The motions of the at least one part of the body of the user induced by the personal care device can comprise repetitive movements caused by the personal care device. Alternatively or in addition, the motions of the at least one part of the body of the user induced by the personal care device can comprise skin deformations. For example, skin deformations may be caused by movement (e.g. a linear movement) of the personal care device over the skin of the at least one part of the body of the user. A skin deformation can, for example, comprise any one or more of a folding of the skin of the at least one part of the body of the user induced by the personal care device, a stretching pattern of the skin of the at least one part of the body of the user induced by the personal care device, a movement of one or more skin markers (e.g. pigments, hair follicles, any other type of skin marker, or any combination of skin markers) of the at least one part of the body of the user induced by the personal care device, or any other skin deformation, or any combination of skin deformations.

Returning back to FIG. 1, the processor 102 of the apparatus 100 can be implemented in numerous ways, with software and/or hardware, to perform the various functions described herein. In particular implementations, the processor 102 can comprise a plurality of software and/or hardware modules, each configured to perform, or that are for performing, individual or multiple steps of the method described herein. The processor 102 may comprise one or more processors (such as one or more microprocessors, one or more multi-core processors and/or one or more digital signal processors (DSPs)), one or more processing units, and/or one or more controllers (such as one or more microcontrollers) that may be configured or programmed (e.g. using software or computer program code) to perform the various functions described herein. The processor 102 may be implemented as a combination of dedicated hardware (e.g. amplifiers, pre-amplifiers, analog-to-digital convertors (ADCs) and/or digital-to-analog convertors (DACs)) to perform some functions and a processor (e.g. one or more programmed microprocessors, DSPs and associated circuitry) to perform other functions. As illustrated in FIG. 1, in some embodiments, the apparatus 100 may comprise a memory 104, or may be configured to communicate with and/or connect to a memory 104 external to (i.e. separate to or remote from) the apparatus 100. The memory 104 may comprise any type of non-transitory machine-readable medium, such as cache or system memory including volatile and non-volatile computer memory such as random access memory (RAM), static RAM (SRAM), dynamic RAM (DRAM), read-only memory (ROM), programmable ROM (PROM), erasable PROM (EPROM), and electrically erasable PROM (EEPROM). In some embodiments, the memory 104 can be configured to store program code that can be executed by the processor 102 of the apparatus 100 to cause the processor 102 to operate in the manner described herein.

Alternatively or in addition, in some embodiments, the memory 104 can be configured to store information resulting from or used in the method described herein. For example, in some embodiments, the memory 104 may be configured to store any one or more of the detected motions of the at least one part of the body of the user, the determined location of the personal care device on the user, or any other information, or any combination of information, resulting from or used in the method described herein. The processor 102 can be configured to control the memory 104 to store information resulting from or used in the method described herein.

As illustrated in FIG. 1, in some embodiments, the apparatus 100 may comprise a user interface 106, or may be configured to communicate with and/or connect to a user interface 106 external to (i.e. separate to or remote from) the apparatus 100. The user interface 106 can be configured to render (or output, display, or provide) information resulting from or used in the method described herein. For example, in some embodiments, the user interface 106 may be configured to render (or output, display, or provide) any one or more of the detected motions of the at least one part of the body of the user, the determined location of the personal care device on the user, or any other information, or any combination of information, resulting from or used in the method described herein. Alternatively or in addition, the user interface 106 can be configured to receive a user input. For example, the user interface 106 may allow a user to manually enter information or instructions, interact with and/or control the apparatus 100. Thus, the user interface 106 may be any user interface that enables the rendering (or outputting, displaying, or providing) of information and, alternatively or in addition, enables a user to provide a user input.

For example, the user interface 106 may comprise one or more switches, one or more buttons, a keypad, a keyboard, a mouse, a touch screen or an application (e.g. on a smart device such as a tablet, a smartphone, or any other smart device), a display or display screen, a graphical user interface (GUI) such as a touch screen, or any other visual component, one or more speakers, one or more microphones or any other audio component, one or more lights (such as light emitting diode LED lights), a component for providing tactile or haptic feedback (such as a vibration function, or any other tactile feedback component), an augmented reality device (such as augmented reality glasses, or any other augmented reality device), a smart device (such as a smart mirror, a tablet, a smart phone, a smart watch, or any other smart device), or any other user interface, or combination of user interfaces. In some embodiments, the user interface that is controlled to render information may be the same user interface as that which enables the user to provide a user input. The processor 102 can be configured to control the user interface 106 to operate in the manner described herein.

As illustrated in FIG. 1, in some embodiments, the apparatus 100 may comprise an imaging (or image) sensor 108, or may be configured to communicate with and/or connect to an imaging sensor 108 external to (i.e. separate to or remote from) the apparatus 100. For example, in some embodiments, an item (e.g. a standard mirror, a smart mirror, or any other item) or a device other than the personal care device (e.g. a smart phone, a tablet, or any other device) may comprise the imaging sensor 108. Thus, the imaging sensor 108 can, for example, be integrated in an item or a device according to some embodiments. In other embodiments, the imaging sensor 108 may be a stand-alone imaging sensor. For example, in some embodiments, the imaging sensor 108 may be mounted on a surface, such as on a unit or wall. The imaging sensor 108 can be configured to acquire images of the user. Thus, the imaging sensor 108 may be directed at the user. For example, the imaging sensor 108 can be directed at the at least one part of the body of the user on which the personal care device is used. The imaging sensor can be any sensor suitable to acquire images (or video). Examples of an imaging sensor 108 include, but are not limited to, a camera, a charge-coupled device (CCD) imaging senor, a complementary metal-oxide semiconductor (CMOS) imaging sensor, or any other type of imaging sensor, or any combination of imaging sensors.

As illustrated in FIG. 1, in some embodiments, the apparatus 100 may comprise a communications interface (or communications circuitry) 110. The communications interface 110 can be for enabling the apparatus 100 (or any components of the apparatus 100, such as the processor 102, the memory 104, the user interface 106, the imaging sensor 108, and/or any other components of the apparatus 100) to communicate with and/or connect to one or more other components, such as other sensors, interfaces, devices, memories, etc. The communications interface 110 may enable the apparatus 100 (or any components of the apparatus 100) to communicate and/or connect in any suitable way. For example, the communications interface 110 may enable the apparatus 100 (or any components of the apparatus 100) to communicate and/or connect wirelessly, via a wired connection, or via any other communication (or data transfer) mechanism. In some wireless embodiments, for example, the communications interface 110 may enable the apparatus 100 (or any components of the apparatus 100) to use radio frequency (RF), Bluetooth, or any other wireless communication technology to communicate and/or connect.

Although not illustrated in FIG. 1, the apparatus 100 may comprise a battery or other power supply for powering the apparatus 100 or means for connecting the apparatus 100 to a mains power supply. It will also be understood that the apparatus 100 may comprise any other component to those described herein or any combination of components.

Although not illustrated in FIG. 1, in some embodiments, the apparatus 100 may comprise the personal care device. Thus, for example, the apparatus 100 may itself be the personal care device according to some embodiments. In these embodiments, the personal care device itself may comprise the processor 102 and optionally also any other components of the apparatus 100 described earlier. In other embodiments, the personal care device may be external to (e.g. separate to or remote from) the apparatus 100.

Figure 2:
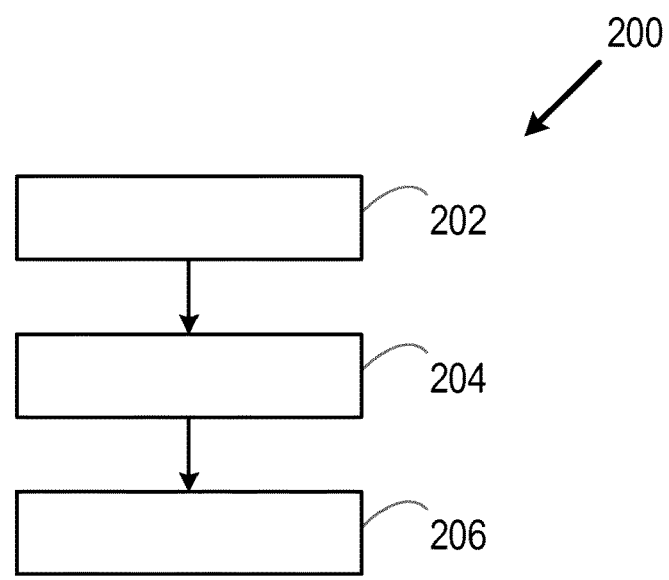
FIG. 2 is a flow chart illustrating a method of operating the apparatus according to an embodiment.

FIG. 2 illustrates a method 200 of operating an apparatus 100 (as described earlier with reference to FIG. 1) to determine a location of a personal care device according to an embodiment. As described earlier, the apparatus 100 comprises a processor 102. The method 200 illustrated in FIG. 2 can generally be performed by or under the control of the processor 102. At block 202 of FIG. 2, a location of one or more parts of the body of the user are detected.

In some embodiments, the processor 102 can be configured to acquire images of the user from an imaging (or image) sensor 108 directed at the user or, more specifically, at the at least one part of the body of the user on which the personal care device is used. As mentioned earlier, the imaging sensor 108 can be an imaging sensor of the apparatus 100 or an imaging sensor 108 external to (i.e. separate to or remote from) the apparatus 100. In some of these embodiments, the processor 102 can be configured to detect the location of the one or more parts of the body of the user from the acquired images of the user. In some embodiments, the processor 102 can be configured to detect a location of one or more anatomical features of the user in the acquired images of the user and detect the location of the one or more parts of the body of a user using the detected location of the one or more anatomical features (or landmarks) of the user in the acquired images of the user. Examples of anatomical features include, but are not limited to, teeth, forehead, cheeks, chin, nose, neck, hair zone, chest, back, bikini line, upper leg, lower leg, or any other anatomical feature of the user, or any combination of anatomical features of the user.

The processor 102 can be configured to detect the location of the one or more parts of the body of the user by any suitable algorithms (or techniques). For example, in some embodiments, computer vision algorithms may be used to detect the one or more parts of the body of the user. Examples of such algorithms include, but are not limited to, skeleton tracking, face tracking, facial expression recognition, skin tone detection, or any other suitable algorithms, or any combination of suitable algorithms. A person skilled in the art will be aware of the manner in which these algorithms can be used to detect the one or more parts of the body of the user. The one or more parts of the body of the user that are detected can form a reference for the localization of the personal care device, since the one or more body parts may themselves move, e.g. within the acquired images of the user.

At block 204 of FIG. 2, motions (or movements) of at least one of the parts of the body of a user induced by the personal care device are detected when the personal care device is in use. As described earlier, the processor 102 of the apparatus is configured to detect the motions of the at least one part of the body of the user induced by the personal care device. In some embodiments, the processor 102 may be configured to detect motions of the at least one part of the body of the user induced by the personal care device by any one or more of registering motions of the at least one part of the body of the user induced by the personal care device, and quantifying motions of the at least one part of the body of the user induced by the personal care device. In embodiments where the processor 102 is configured to acquire images of the user, the processor 102 may be configured to detect the motions of the at least one part of the body of the user induced by the personal care device from the acquired images of the user.

In some embodiments, the processor 102 may be configured to detect motions of the at least one part of the body of the user induced by the personal care device using Eulerian video magnification (EVM). For example, the processor 102 can be configured to employ computer vision algorithms that use Eulerian video magnification (EVM) to detect motions of the at least one part of the body of the user induced by the personal care device. A person skilled in the art will be aware of the manner in which motions can be detected using Eulerian video magnification (EVM), which may be employed to detect the motions of the at least one part of the body of the user induced by the personal care device. For example, the technique described in the paper entitled "*Eulerian Video Magnification for Revealing Subtle Changes in the World*", by Hao-Yu Wu et al, may be employed.

In some embodiments, the processor 102 may be configured to acquire a time series of color values at any spatial location in an acquired image (e.g. a pixel in a two-dimensional image or a voxel in a three-dimensional image) of the user and amplify a variation in a predetermined temporal frequency band. The temporal frequency band can be determined by the (expected) temporal frequency applied to the skin by the personal care device. If the temporal frequency of the personal care device is unknown, the processor 102 may be configured to perform a frequency band sweep to detect the motions of the at least one part of the body of the user. In some of these embodiments, the processor 102 may also be configured to lock on the frequency band when motions are detected. In some embodiments, the processor 102 may be configured to apply a linear approximation related to a brightness constancy assumption used in optical flow formulations in the detection of the motions of the at least one part of the body of the user induced by the personal care device.

Figure 3:
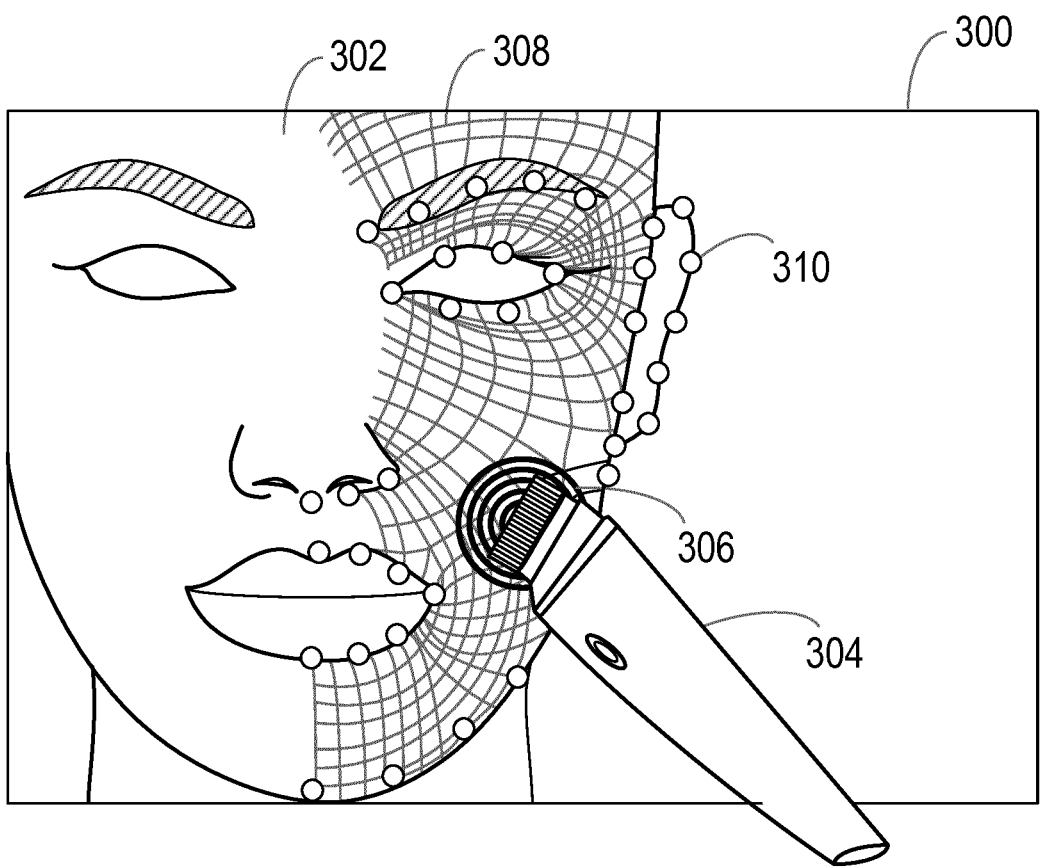
FIG. 3 is a schematic representation of an image of a user using a personal care device according to an embodiment.

FIG. 3 is a schematic representation of an image 300 of a user 302 using a personal care device 304 where motions 306 of at least one part of the body of the user 302 induced by the personal care device 304 are detected from a body map 308 according to an example embodiment. In the example embodiment illustrated in FIG. 3, the personal care device 304 is a skin care device and the at least one part of the body of the user 302 is the skin of the face of the user 302. As illustrated in FIG. 3 and as described earlier, in some embodiments, the processor 102 can also be configured to detect a location of one or more anatomical features (or landmarks) 310 of the user 302 in the acquired image 300 of the user 302 for use in the detection of the one or more parts of the body of a user.

Returning back to FIG. 2, motions of at least one of the parts of the body of the user induced by the personal care device are thus detected at block 204 of FIG. 2 in the manner described earlier when the personal care device is in use. Then, at block 206 of FIG. 2, the location of the personal care device on the user is determined based on the detected motions of the at least one part of the body of the user in relation to the detected location of the at least one part of the body of the user. For example, the location of the personal care device on the user can be determined by mapping the location of the detected motions (e.g. in an image acquired of the user) to the detected location of the at least one part of the body of the user. In some embodiments, the determined location of the personal care device on the user can be a location at which (e.g. a center of) a portion of the personal care device contacts (or touches) the user. In some embodiments, the portion of the personal care device that contacts the user may, for example, be a portion of the personal care device that is configured to treat the user, such as a treatment unit of the personal care device. Thus, a relative location of the personal care device on the user is determined.

In some embodiments, the processor 102 may be configured to identify a signature of the detected motions of the at least one part of the body of the user induced by the personal care device. The identified signature can, for example, be indicative of a type of personal care device. In these embodiments, the processor 102 may be configured to determine the location of the personal care device on the user based on the detected motions of the at least one part of the body of the user in relation to the detected location of the at least one part of the body of the user and the identified signature of the detected motions.

In some embodiments, the processor 102 can be configured to estimate a location of a source of the detected motions of the at least one part of the body of the user. In these embodiments, the processor 102 may be configured to determine the location of the personal care device on the user based on the estimated location of the source of the detected motions of the at least one part of the body of the user. For example, vibrations from a portion of the personal care device applied to the at least one part of the body of the user can propagate through the at least one part of the body of the user in a certain way in all directions around the portion of the personal care device applied to the at least one part of the body of the user when the personal care device is in use. This makes it possible to estimate the source (or center) of the detected motions of the at least one part of the body of the user. The source of the detected motions of the at least one part of the body of the user can then be used to determine the location of the personal care device on the user.

In some embodiments, the processor 102 can be configured to determine the location of the personal care device on the user based on the detected motions of the at least one part of the body of the user in relation to the detected location of the at least one part of the body of the user and one or more other parameters, such as any one or more of an angle of the personal care device with respect to the at least one part of the body of the user, a setting (e.g. a treatment setting) in which the personal care device is operating, a type of at least one component of the personal care device (e.g. a brush head type of a toothbrush), and a pressure applied by the personal care device on the at least one part of the body of the user. In this way, the location estimation of the personal care device can be improved. In some of these embodiments, the personal care device may be configured to communicate the one or more other parameters (e.g. in real-time) to the processor 102 of the apparatus 100. Thus, the processor 102 can be configured to acquire the one or more other parameters from the personal care device according to some embodiments.

In some embodiments, the processor 102 may be configured to track the location of the personal care device on the user. As described earlier, the processor 102 is configured to detect a location of (or localize) one or more parts of the body of the user. Thus, the processor 102 may be configured to track the location of the personal care device on the user in relation to one or more of the detected parts of the body of the user, which may be the at least one part of the body of the user on which the personal care device is in use and/or at least one other part of the body of the user.

In some embodiments, in addition to body part detection, the processor 102 may be configured to detect (or localize) one or more contours of the body of the user (or of a part of the body of the user, such as the face, head, torso, legs, any other body part, or any combination of body parts), one or more locations on the body of the user (or of a part of the body of the user, such as any of those mentioned earlier), one or more orientations of the body of the user (or of a part of the body of the user, such as any of those mentioned earlier), and/or one or more anatomical features or landmarks of the body of the user (or of a part of the body of the user, such as any of those mentioned earlier), in relation to which the location of the personal care device on the user can be tracked. Examples of anatomical features or landmarks include, but are not limited to, teeth, forehead, cheeks, chin, nose, neck, hair zone, chest, back, bikini line, upper leg, lower leg, or any other anatomical feature of the user, or any combination of anatomical features of the user.

The processor 102 may be configured to employ any computer vision algorithm suitable for (e.g. three-dimensional) body part tracking to track the location of the personal care device on the user. In some embodiments, the processor 102 may be configured to track the location of the personal care device on the user in the acquired map or body map described earlier (and as illustrated by way of the example embodiment of FIG. 3). This can provide a more fine-grained algorithm. For example, as illustrated in FIG. 3, one or more of the anatomical features or landmarks 310 of the body of the user (or of a part of the body of the user) mentioned earlier may be identified in the acquired map or body map according to an example embodiment. In this example embodiment, the processor 102 can be configured to track the location of the personal care device on the user in relation to these anatomical features or landmarks 310 identified in the acquired map or body map.

In some embodiments where the processor 102 is configured to track the location of the personal care device on the user, the processor 102 may also be configured to control a user interface 106 to output guidance to the user based on the tracked location of the personal care device on the user. In addition to the tracked location, in some embodiments, the processor 102 may be configured to control a user interface 106 to output guidance to the user also based on any one or more of an area already covered by the personal care device, a prior usage of the personal care device, a condition of a local area on which the personal care device is being used. As mentioned earlier, the user interface 106 may be a user interface of the apparatus 100 or a user interface external to (i.e. separate to or remote from) the apparatus 100.

In some embodiments, the guidance output by the user interface 106 may be directed to the manner in which to use the personal care device. For example, the guidance output by the user interface 106 may comprise any one or more of an indication (e.g. an illustration) of which areas the user has treated, an indication (e.g. an illustration) of which areas the user has not yet treated, an indication of a length of time the user has treated a certain area, an indication of a length of time since the user has treated a certain area, an indication of which area requires extra attention (e.g. problematic teeth indicated by the user or a dentist, certain skin areas indicated by a beautician, and so on), an indication of which area (e.g. an area around eyes) requires extra careful treatment, an indication (e.g. advice) to use a certain setting on the personal care device for a certain area, an indication (e.g. advice) to avoid a certain setting on the personal care device for a certain area, or any other type of guidance, or any combination of guidance.

In some embodiments, in addition to the determination of the location of the personal care device on the user discussed earlier, the processor 102 may be further configured to detect any one or more of the movement direction of the personal care device on the user based on the detected motions of the at least one part of the body of the user and a pressure applied by the personal care device on the user based on the detected motions of the at least one part of the body of the user. For example, in some embodiments, the movement direction of the personal care device on the user can be determined by analyzing the (e.g. relatively slow) movement of a center of the detected motions of the at least one part of the body of the user. In some embodiments, the pressure applied by the personal care device on the user can be analyzed by observing changes in characteristics of the detected motions of the at least one part of the body of the user induced by the personal care device and a spread of the detected motions (e.g. vibrations) of the at least one part of the body of the user induced by the personal care device. For example, the observed changes in the characteristics of the detected motions may then be matched with reference characteristics stored in a memory 104 with associated applied pressures, where the stored reference characteristics may be indicative of low versus high applied pressure. As mentioned earlier, the memory 104 may be a memory of the apparatus 100 or a memory external to (i.e. separate to or remote from) the apparatus 100.

In some embodiments, the processor 102 can be further configured to determine a local property of the at least one part of the body of the user based on the detected motions of the at least one part of the body of a user induced by the personal care device. For example, the processor 102 may be configured to identify a characteristic (or signature) of the detected motions of the at least one part of the body of the user induced by the personal care device and compare the identified characteristic to known motion characteristics (or signatures) for the personal care device. The known motion characteristics for the personal care device may, for example, be stored in a memory 104 with associated properties (e.g. in the form of a look-up table). As mentioned earlier, the memory 104 may be a memory of the apparatus 100 or a memory external to (i.e. separate to or remote from) the apparatus 100. In some embodiments, the property associated with a known motion characteristic for the personal care device that matches or most closely matches (e.g. is most similar to) the identified characteristic of the detected motions of the at least one part of the body of the user may be selected as the local property of the at least one part of the body of the user.

A local property of the at least one part of the body of the user can be any type of property of the at least one part of the body that is determined for a particular location. A local property can, for example, be indicative of a local condition of the at least one part of the body of the user and/or changes (e.g. improvements) in the at least one part of the body of the user due to the use of the personal care device. In embodiments where the personal care device is a skin care device, the local property may be a local skin property, such as a local measure of skin elasticity, a local measure of skin thickness, a local measure of lipid (e.g. oil or fat) content in the skin, a local measure of water content in the skin, or any other local skin property, or any combination of local skin properties. In embodiments where the personal care device is a tooth care device, the local property may be a local pressure applied by the personal care device to a tooth, a local proximity of the personal care device to a tooth, or any other local tooth property, or any combination of local tooth properties. In embodiments where the personal care device is a hair care device, the local property may be a local hair wetness, a local hair dryness, or any other local hair property, or any combination of local hair properties.

In some embodiments, the processor 102 may be further configured to adjust one or more settings of the personal care device based on the determined location of the personal care device on the user. The adjustment of the one or more settings of the personal care device may be automatic according to some embodiments. In some embodiments, as described earlier, the processor 102 can be configured to determine a local property of the at least one part of the body of the user based on the detected motions of a part of the body of a user induced by the personal care device. In some of these embodiments, the processor 102 can then be configured to adjust one or more settings of the personal care device based on the determined location of the personal care device on the user and the determined local property of the at least one part of the body of the user.

The one or more settings can, for example, be one or more operational settings of the personal care device that control the manner in which the personal care device operates. Examples of the one or more settings that may be adjusted include, but are not limited to, a brushing speed, intensity and/or pattern of a toothbrush, a speed, pattern and/or direction (e.g. dependent on the side of the face or based on a determined local elasticity of the skin) of a skin cleansing device, a cutting speed and/or depth of a shaver (e.g. cheek versus neck), a cutting speed and/or depth of a trimmer or groomer (e.g. head or back versus bikini line), a heat, airflow speed and/or airflow direction of a hairdryer (e.g. depending on a determined local hair wetness and/or a proximity of the hairdryer to the hair), a stopping mechanism to stop operation of the personal care device (e.g. when applied to inappropriate areas, such as the eyes), or any other setting, or any combination of settings, of the personal care device.

In some embodiments where a local property of the at least one part of the body of the user is determined, the processor 102 may be configured to determine the location of the personal care device on the user based on the detected motions of the at least one part of the body of the user in relation to the detected location of the at least one part of the body of the user and the determined local property of the at least one part of the body of the user. In this way, the local property can be used to improve the reliability of the determined location of the personal care device on the user. For example, motion responses induced by a personal care device may vary on different parts of the body of the user based on the local properties of those parts of the body and thus this information can aid in the accurate determination of the location of the personal care device on the user.

Figure 4:
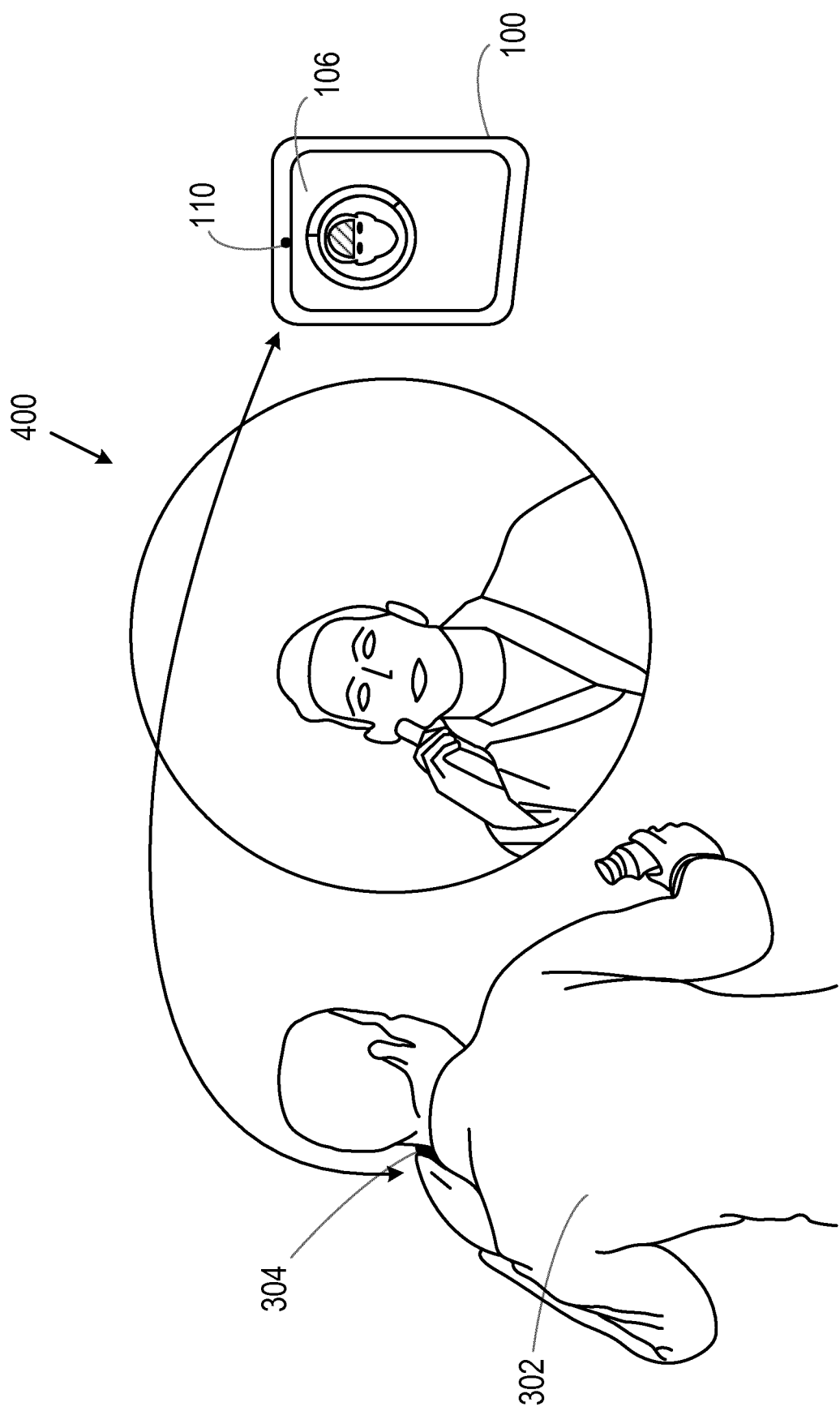
FIG. 4 is a schematic representation of an apparatus in use in a system according to an example embodiment.

FIG. 4 illustrates the apparatus 100 described earlier in use in a system 400 according to an embodiment. As illustrated in FIG. 4, according to some embodiments, a system 400 can comprise the apparatus 100 and a personal care device 304 as described earlier. The personal care device 304 is operable by a user 302. In the illustrated example embodiment of FIG. 4, the apparatus 100 comprising the processor 102 is a smart device such as a tablet. The apparatus 100 according to this illustrated example embodiment also comprises the user interface 106 and the imaging sensor 108 described earlier.

Figure 5:
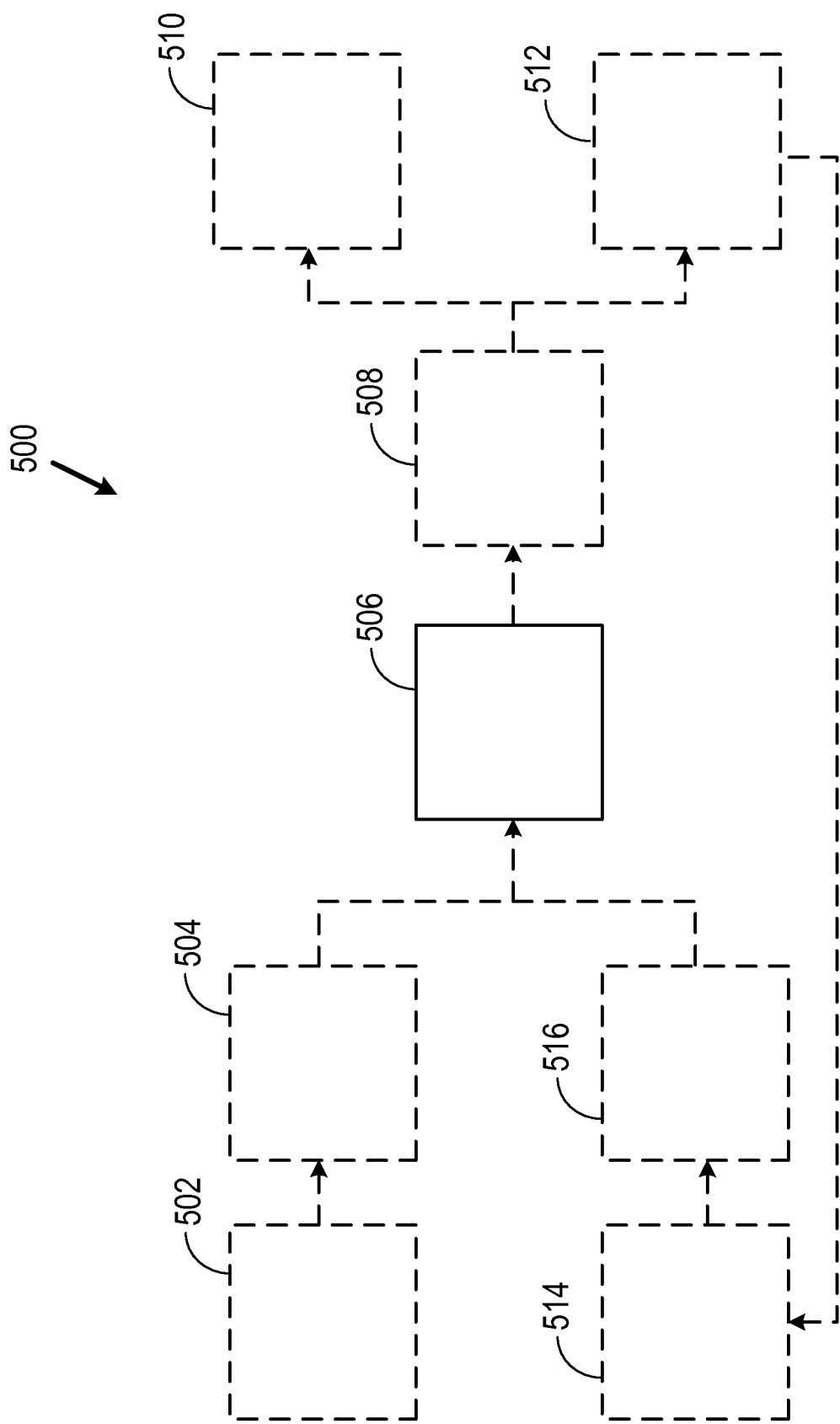
FIG. 5 is a flow chart illustrating a method of operating the apparatus in use in the system according to the example embodiment.

FIG. 5 illustrates a method 500 of operating the apparatus 100 of the system 400 of the example embodiment illustrated in FIG. 4 to determine a location of the personal care device 304 on the user 302. The method 500 illustrated in FIG. 5 can generally be performed by or under the control of the processor 102 of the apparatus 100. At block 502 of FIG. 5, the processor 102 of the apparatus 100 acquires images of the user from the imaging sensor 108 directed at the user 302. At block 504 of FIG. 5, the processor 102 detects a location of (or localizes) one or more parts of the body of a user 302 in the images acquired of the user 302. In this illustrated example embodiment, the one or more detected parts of the body of the user 302 are the one or more parts of the body of the user 302 on which the personal care device 304 is in use, which is the face of the user 302.

At block 506 of FIG. 5, the processor 102 detects motions 306 of at least one part of the body of a user 302 induced by the personal care device 304 when the personal care device 304 is in use and determines the location of the personal care device 304 on the user 302 based on the detected motions 306 of the at least one part of the body of the user 302 in relation to the detected location of the at least one part of the body of the user (such as in any of the manners described earlier). Thus, a relative location of the personal care device 304 on the user 302. At block 508 of FIG. 5, the processor 102 determines a local property of the at least one part of the body of the user 302 based on the detected motions of the at least one part of the body of a user 302 induced by the personal care device 304. In this illustrated example embodiment, the local property can, for example, be indicative of a local condition of the at least one part of the body of the user 302 (such as a local condition of the hair and/or skin on the face of the user 302). At block 510 of FIG. 5, the processor 102 controls the user interface 106 to output guidance to the user 302 based on the tracked location of the personal care device 304 on the user 302, which may include any of the guidance described earlier.

At block 512 of FIG. 5, the processor 102 determines one or more settings of the personal care device 304 to adjust based on the determined location of the personal care device 304 on the user 302 and, at block 514 of FIG. 5, the processor 102 adjusts those one or more settings of the personal care device 304 based on the determined location of the personal care device 304 on the user 302 in the manner described earlier. At block 516 of FIG. 5, the processor 102 may acquire one or more (e.g. treatment) parameters from the personal care device that can be used to improve the determination of the location of the personal care device on the user (at block 506) and/or the local property (at block 508). These parameters may include, for example, any of those mentioned earlier such as one or more of an angle of the personal care device with respect to the at least one part of the body of the user, a setting (e.g. a treatment setting) in which the personal care device is operating, a type of at least one component of the personal care device (e.g. a brush head type of a toothbrush), and a pressure applied by the personal care device on the at least one part of the body of the. For example, if it is known that the personal care device delivers a certain vibration pattern related to a certain treatment setting, then a temporal filter within an Eulerian video magnification (EVM) algorithm at block 506 can be tuned towards this frequency band and pattern.

In any of the embodiments described herein, the apparatus 100 (or, more specifically, the processor 102 of the apparatus 100) may be configured to connect to cloud services, e.g. via the communications interface 110. In this way, the processor 102 of the apparatus 100 can make use of information (e.g. big data) from the cloud services for use in the method described herein. For example, the processor 102 of the apparatus 100 may acquire from the cloud services one or more of maps or body maps for certain skin types, which may disclose one or more properties of the at least one part of the body of the user (such as skin thickness, elasticity, or any other properties of the at least one part of the body of the user such as any of those mentioned earlier) in relation to coordinates (e.g. anatomical features or landmarks) on the at least one part of the body of the user.

This acquired information can be used, for example, to optimize the guidance mentioned earlier, the settings of the personal care device mentioned earlier and/or a treatment regime schedule. Furthermore, the connection to the cloud services can be used to communicate localized usage and sensor data between users and personal care professionals (e.g. dentists, beauticians, hair stylists, dermatologists, hair specialists, or any other personal care professionals), such that an optimal personalized treatment regime can be established (e.g. for certain problem areas) and adherence to those schemes can be monitored. Furthermore, reminders and real-time guidance can be provided to the user based on these regimes in combination with the usage data. Also, localized usage data (which can be anonymized) may be useful for device manufacturers to understand the manner in which their personal care devices are used, to measure the effectiveness of the personal care devices and identify issues related to over/under use, misuse, product design, and so forth, of the personal care devices.

In any of the embodiments described herein, at least one or all of the steps that the processor 102 is configured to perform can be automated.

There is also provided a computer program product comprising a computer readable medium. The computer readable medium has computer readable code embodied therein. The computer readable code is configured such that, on execution by a suitable computer or processor, the computer or processor is caused to perform the method described herein. The computer readable medium may be, for example, any entity or device capable of carrying the computer program product. For example, the computer readable medium may include a data storage, such as a ROM (such as a CD-ROM or a semiconductor ROM) or a magnetic recording medium (such as a hard disk). Furthermore, the computer readable medium may be a transmissible carrier, such as an electric or optical signal, which may be conveyed via electric or optical cable or by radio or other means. When the computer program product is embodied in such a signal, the computer readable medium may be constituted by such a cable or other device or means. Alternatively, the computer readable medium may be an integrated circuit in which the computer program product is embedded, the integrated circuit being adapted to perform, or used in the performance of, the method described herein.

There is thus provided herein an apparatus, a method and a computer program product that address the limitations associated with the existing techniques.

Variations to the disclosed embodiments can be understood and effected by those skilled in the art in practicing the principles and techniques described herein, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. An apparatus for determining a location of a personal care device on a user, wherein the apparatus comprises a processor configured to:
   acquire images of the user from an imaging sensor directed at the user;
   detect from the acquired images of the user a location of one or more parts of the body of the user;
   detect from the acquired images of the user motions of at least one part of the body of the one or more parts of the body of the user induced by the personal care device when the personal care device is in use; and
   determine the location of the personal care device on the user based on the detected motions of the at least one part of the body of the user in relation to the detected location of the at least one part of the body of the user.

2. The apparatus as claimed in claim 1, wherein the processor is configured to detect motions of the at least one part of the body of the user induced by the personal care device using Eulerian video magnification.

3. The apparatus as claimed in claim 1, wherein the apparatus comprises the image sensor.

4. The apparatus as claimed in claim 3, wherein the processor is configured to:
   detect a location of one or more anatomical features of the user in the acquired images of the user; and detect the location of the one or more parts of the body of a user using the detected location of the one or more anatomical features of the user in the acquired images of the user.

5. The apparatus as claimed in claim 1, wherein the processor is configured to:
identify a signature of the detected motions of the at least one part of the body of the user induced by the personal care device, wherein the identified signature is indicative of a type of personal care device; and
determine the location of the personal care device on the user based on the detected motions of the at least one part of the body of the user in relation to the detected location of the at least one part of the body of the user and the identified signature of the detected motions.

6. The apparatus as claimed in claim 1, wherein the processor is configured to:
estimate a location of a source of the detected motions of the at least one part of the body of the user; and
determine the location of the personal care device on the user based on the estimated location of the source of the detected motions of the at least one part of the body of the user.

7. The apparatus as claimed in claim 1, wherein the processor is configured to determine the location of the personal care device on the user based on the detected motions of the at least one part of the body of the user in relation to the detected location of the at least one part of the body of the user and any one or more of:
an angle of the personal care device with respect to the at least one part of the body of the user;
a setting in which the personal care device is operating;
a type of at least one component of the personal care device; and
a pressure applied by the personal care device on the at least one part of the body of the user.

8. The apparatus as claimed in claim 1, wherein the processor is configured to:
track the location of the personal care device on the user; and control a user interface to output guidance to the user based on the tracked location of the personal care device on the user.

9. The apparatus as claimed in claim 1, wherein the processor is further configured to:
determine a local property of the at least one part of the body of the user based on the detected motions of the at least one part of the body of a user induced by the personal care device.

10. The apparatus as claimed in claim 1, wherein the processor is further configured to: adjust one or more settings of the personal care device based on the determined location of the personal care device on the user.

11. The apparatus as claimed in claim 10, wherein the processor is configured to:
adjust one or more settings of the personal care device based on the determined location of the personal care device on the user and the determined local property of the at least one part of the body of the user.

12. The apparatus as claimed in claim 1, wherein:
the personal care device comprises a hair care device and the at least one part of body of the user comprises hair of the user; or
the personal care device comprises a tooth care device and the at least one part of the body of the user comprises one or more teeth; or
the personal care device comprises a skin care device and the at least one part of the body of the user comprises skin of the user.

13. The apparatus as claimed in claim 1, wherein the apparatus comprises the personal care device.

14. A method of operating an apparatus comprising a processor to determine a location of a personal care device, wherein the method comprises:
acquiring images of a user from an imaging sensor directed at the user;
detecting from the acquired images of the user a location of one or more parts of the body of the user;
detecting from the acquired images of the user motions of at least one part of the body of the one or more parts of the body of the user induced by the personal care device when the personal care device is in use; and
determining the location of the personal care device on the user based on the detected motions of the at least one part of the body of the user in relation to the detected location of the at least one part of the body of the user.

15. A non-transitory computer readable medium comprising computer readable code embodied therein, the computer readable code being configured such that, on execution by a suitable computer or processor, the computer or processor is caused to:
acquire images of a user from an imaging sensor directed at the user;
detect from the acquired images of the user a location of one or more parts of the body of the user;
detect from the acquired images of the user motions of at least one part of the body of the one or more parts of the body of the user induced by the personal care device when the personal care device is in use; and
determine the location of the personal care device on the user based on the detected motions of the at least one part of the body of the user in relation to the detected location of the at least one part of the body of the user.

* * * * *